United States Patent [19]

Hilliges

[11] 4,356,352
[45] Oct. 26, 1982

[54] CIRCUIT ARRANGEMENT FOR TELEPHONE EXCHANGE SYSTEMS HAVING TIME STAGGERED CHARGE METERING PULSE FREQUENCIES

[75] Inventor: Friedrich Hilliges, Eichenau, Fed. Rep. of Germany

[73] Assignee: Siemens Aktiengesellschaft, Berlin & Munich, Fed. Rep. of Germany

[21] Appl. No.: 153,868

[22] Filed: May 28, 1980

[30] Foreign Application Priority Data

Jun. 26, 1979 [DE] Fed. Rep. of Germany ....... 2925794

[51] Int. Cl.³ ..................... H04M 15/12; H04Q 3/70
[52] U.S. Cl. .............................. 179/7.1 R; 179/18 D
[58] Field of Search .................. 179/18 D, 12, 11, 10, 179/9, 8 R, 7.1 R, 7 R, 18 B

[56] References Cited

U.S. PATENT DOCUMENTS 3,691,301 9/1972 Zarouni ........................... 179/7.1 R
3,934,095 1/1976 Matthews et al. ................ 179/18 D
4,163,124 7/1979 Jolissaint ........................... 179/18 D

FOREIGN PATENT DOCUMENTS 1129560 5/1962 Fed. Rep. of Germany ... 179/7.1 R

Primary Examiner—Thomas W. Brown
Attorney, Agent, or Firm—Hill, Van Santen, Steadman, Chiara & Simpson

[57] ABSTRACT

A calling subscriber, in dialing a special code before a subscriber number, causes a renunciation character to be stored in a trunk exchange to provide him with priority in trunk line selection, when reduced charge metering equipment, is in operation; otherwise, priority is equal for all calls. Upon completion of trunk connection on a priority basis, a charge reduction signal is transmitted to the charge metering equipment. If all trunks are busy, a priority call is provided with a predetermined number of repeated trunk selection cycles.

3 Claims, 1 Drawing Figure

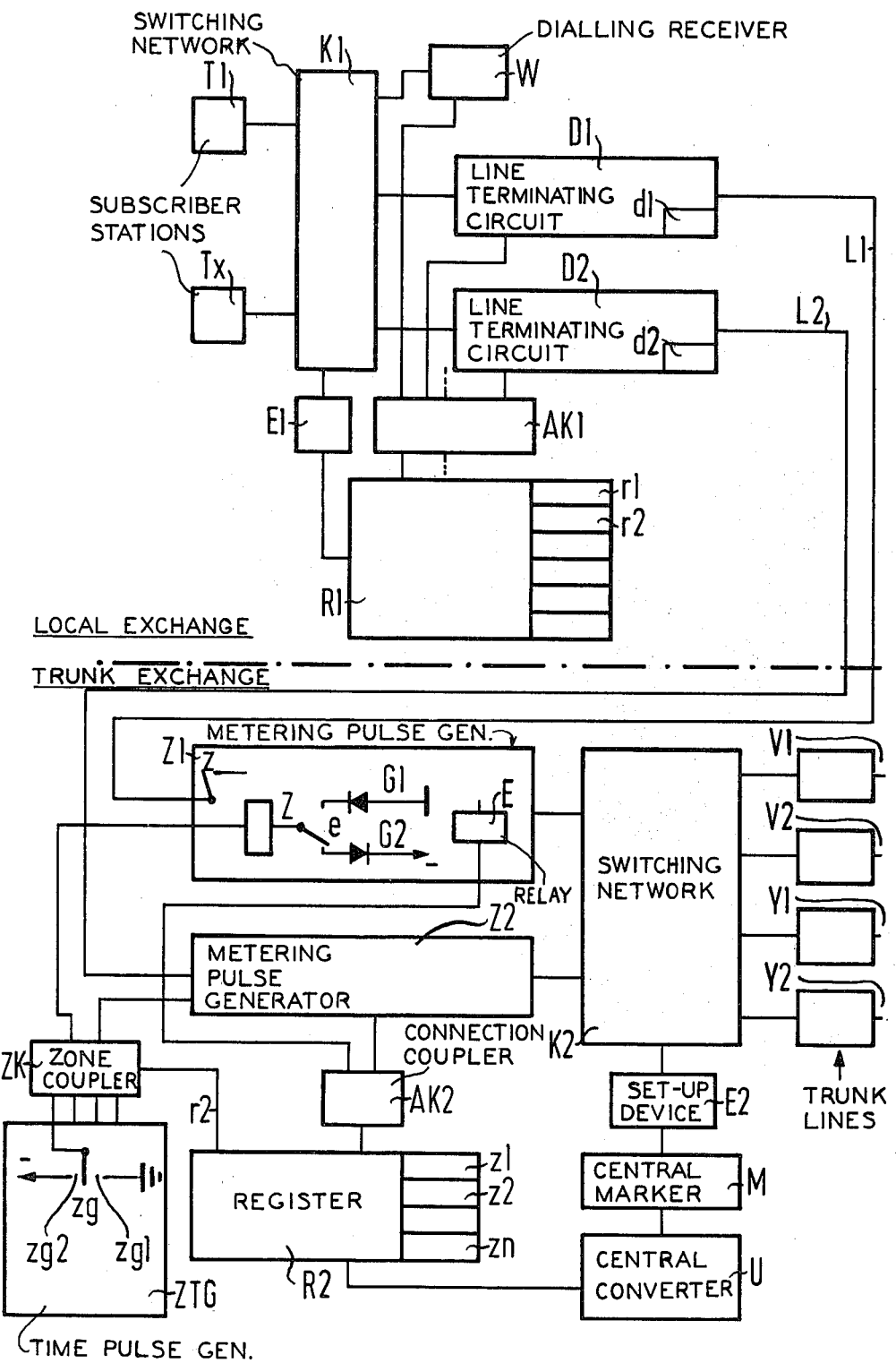

CIRCUIT ARRANGEMENT FOR TELEPHONE EXCHANGE SYSTEMS HAVING TIME STAGGERED CHARGE METERING PULSE FREQUENCIES

BACKGROUND OF THE INVENTION

1. Field of the Invention

The present invention relates to a circuit arrangement for telecommunications exchange systems, in particular telephone exchange systems, in which trunk telephone connections are established with the aid of common control devices via free connection lines combined in groups, by dialing a local code number and a subscriber number, and in which, in the case of trunk telephone connections, when the called subscriber has answered, charge metering pulses which are to be added up are produced in respect of the calling subscriber, and in which, likewise using the common control device, the frequency of the charge metering pulses which are produced for a trunk telephone connection is generally reduced, on the one hand, in dependence upon the distance involved, and, on the other hand, in dependence upon the time of day and/or calendar days, e.g. week days, general holidays.

2. Description of the Prior Art

Circuit arrangements of this general kind have been disclosed in great variety. Large numbers of the circuit arrangements of the known type are in use in the German Post Office. The emission of charge metering pulses which are staggered in accordance with the time of day and days of the week in terms of the charge metering pulse frequencies results in an improved distribution of the overall occurring traffic load. After-work tariffs and night tariffs and holiday tariffs cause the telephone subscribers to make their telephone calls not only during typical main traffic times, but also at times of day, and on calendar dates, at which lower charge metering pulse frequencies apply for the same call distances, which results in the advantage of a saving of costs for the calling subscriber.

The use of circuit arrangements of the above-described, known type involves problems due to a particular accumulation of connection requests, thus a particular peak loading, at the beginning of and just prior to the end of times of day and calendar dates on which reduced charge metering pulse frequencies apply. It therefore occurs that directly following the time at which the charge metering pulse frequencies are reduced, the main trunk connection paths become so overloaded that only a relatively small proportion of the trunk telephone connections being dialed are actually successful; the majority of the trunk telephone connections dialed are terminated because lines are engaged.

In this context, the German allowed and published application No. 1,249,357 has disclosed a circuit arrangement in which facilities have been provided for distinguishing the situation of "line engaged" from the situation of "subscriber engaged". In the former case, a switch-through attempt across a switching network is repeated, whereas in the latter case engaged signals are transmitted to the calling subscriber. In this known case, the repetition of the switch-through attempts in a specified rhythm results in a limitation of lost calls without any noticeable extra marking load. However, this known situation refers to a connection establishment within a private branch exchange (PBX) telephone exchange system or a local telephone exchange system. If, on the other hand, one is concerned with the establishment of trunk telephone connections, defined in the introduction as known, the repetition of switch-through attempts across trunk telephone connection lines results in the fact that trunk telephone connections which have already been partially established via trunk telephone connection lines temporarily assume a waiting state which, viewed overall, again leads to an increase in the traffic load of the group of telephone connection lines if facilities for repeating switch-through attempts in the event that lines are engaged are generally provided in respect of all trunk telephone connections.

SUMMARY OF THE INVENTION

The object of the present invention is to avoid the subscribers connected to the telephone exchanges being confronted with the hitherto reoccurring blockages without this leading to a drop in charge receipts for the relevant telephone administration authority. The avoidance of blockages of specific traffic conditions is of particular significance to authorities, institutions and private individuals entrusted with responsibilities affecting the safety and protection of the population (e.g. catastrophe protection). If, in the context of the invention, extra loading occurs in the exchanges, control devices, and possibly the groups of connection lines connected thereto, it is necessary to avoid drops in charge revenue for the telephone administration authority in question.

This object is realized in accordance with the invention in that, on the reception of a special code number which is dialed in addition to the local code number and the telephone subscriber number, and in particular precedes the latter, in association with the establishment of a trunk telephone connection, the common control device stores an abandonment signal for this trunk telephone connection. As regards hunting procedures to select a free connection line from a group of connection lines for each of a plurality of simultaneously established trunk telephone connections, the common control device only selects a free connection line from the relevant group, giving priority to those trunk telephone connections in respect of which a renunciation characteristic has been stored in comparison to those trunk telephone connections in respect of which no renunciation characteristic has been stored when the reduction in the charge metering pulse frequencies which apply to various range zones which is dependent upon the time of day and/or the calendar date is in operation, but otherwise carries out the hunting procedures with equal priority for the various trunk telephone connections. Following the establishment of a trunk telephone connection, in respect of which a renunciation characteristic is stored, the common control device deactuates a criterion which results in a reduction in the frequency of the charge metering pulses in respect of this trunk telephone connection.

BRIEF DESCRIPTION OF THE DRAWING

Other objects, features and advantages of the invention will be best understood from the following detailed description taken in conjunction with the accompanying drawing, on which there is a single FIGURE which is a schematic representation of an exemplary embodiment of the invention.

DESCRIPTION OF THE PREFERRED EMBODIMENT

As a foreword, devices and processes for the establishment of self-dialed trunk connections are generally known in various forms. Reference will be made to the trunk dialing system 62 of the German Post Office described in "Unterrichsblatter der Deutschen Bundespost", Vol. No. 11 of Edition 22 (1969) which provides a survey of the overall description of this trunk dialing system on Pages 325 and 326. Reference will also be made to the book by Rudolf Fuhrer, "Landesfernwahl II, Geratetechnik" (second edition) published by R. Oldenburg (Munich) which, on Page 226 ff, gives further details of this trunk dialing system as employed in the national trunk dialing system of the German Post Office. This trunk dialing system will be assumed to form part of the knowledge of those skilled in the art and will thus be assumed to be known.

The drawing illustrates a local exchange (above the dash-dotted line) and a trunk exchange (below the dash-dotted line). If one of the subscribers who is connected by his subscriber station to the local exchange desires to establish a telephone connection, he first lifts the handset in his subscriber station. In known manner, this results in a call pulse in the subscriber connection circuit assigned to this subscriber, as a result of which the relevant subscriber terminal is connected in a manner which has not been shown in detail to a free dialing receiver W via the switching network K1. In the manner indicated, the switching network can comprise elongate grouping and also reverse grouping. Examples of both basic types of grouping are illustrated and described in the German Pat. No. 1,276,115.

A connection is established from one of the subscriber stations T1 to Tx in that, in known manner firstly a subscriber line loop is closed via the subscriber connection line so that in the relevant subscriber connection circuit a call pulse is produced which causes the subscriber station in question to be connected via the switching network to a free dialing receiver W. The latter transmits a dialing tone across the switched through switching network connection to the relevant subscriber station. On the basis of the received dialing tone the subscriber in the subscriber station, e.g. T1, transmits items of dialed information, for example by means of a dial switch or a dialing keyboard. The individual digits are received in assigned dialing receivers W as items of dialed information.

A desired connection can consist of not only an internal local connection, but also an external trunk connection. If the subscriber in question wishes to establish a trunk connection, first he dials the traffic distingishing digit zero. In the case of a local connection, the calling subscriber dials merely the subscriber number of the other subscriber to whom he wishes to be connected.

If the subscriber in question wishes to establish a trunk connection, following the traffic distinguishing digit zero he dials a multidigit local code number which governs the trunk connection which is to be established and which characterizes a specific remote local exchange. If the traffic distinguishing digit zero is now received in the dialing receiver W, the subscriber station T1 in question is switched over via the switching network K1 from the dialing receiver in question to a free line terminating set, see D1. In this respect, see German Pat. No. 1,256,265. The local exchange illustrated in the drawing above the dash-dotted line is connected to the trunk exchange below the dash-dotted line via a group of connection lines L1, L2 and so on. These connection lines are assigned line terminating circuits D1 and D2. If these connection lines extend within an exchange, it is also possible to dispense with the line terminating circuits D1 and D2.

Therefore, if a calling subscriber has dialed the traffic distinguishing digit zero, he is connected via a free connection line, eg. L1, to a free metering pulse generator, e.g. Z1. The other digits dialed by the calling subscriber following the traffic distinguishing digit represent the local code number which consists in known fashion of three or four digits. A number of registers are provided, of which a register R2 has been indicated. This contains a number of storage units $z1$ to $zn$ which can be individually assigned to the metering pulse generators Z1, Z2 and so on or can be assigned as and when required to these metering pulse generators by means of addresses. It is also possible to provide a large number of registers in which case each of the registers is temporarily or semi-permanently assigned to a metering pulse generator for the duration of the connection establishment.

The local code number which is dialed in order to establish a trunk telephone connection is stored in a memory unit, e.g. $z1$, assigned to the metering pulse generator being used, e.g. Z1, within the register R2. As soon as the local code number has been stored in full, it is transferred to the central converter U. The latter emits an item of information via a group of trunk lines which are to be operated to the central marker M which, with the aid of the setting up device E2, makes a selection from among the free trunk lines belonging to the group of trunk lines in question, and, moreover, establishes a connection via the switching network K2 to the relevant line terminating circuit of the selected trunk connection lines. The drawing illustrates two groups of trunk connection lines, one of which is referenced V1 to V2 and the other of which is referenced Y1 to Y2. The establishment of these connections via the switching network K2 will be assumed to proceed in the manner described in the German Pat. No. 1,226,165.

During the course of the establishment of a connection the central converter U also emits a zone characteristic which characterizes the charge zone which governs the trunk telephone connection being established, and, in fact, for the transmission of charge metering pulses from the metering pulse generator in question to the charge meter of the calling subscriber. Here, reference is made to the German Pat. No. 2,218,129. In addition to a connection coupler AK2 which serves to connect the metering pulse generator Z1, Z2 etc. to the register R2, a zone coupler ZK is also provided which serves to connect the metering pulse generator to a specific output of a time pulse generator ZTG. Between the time pulse generator ZTG and the zone coupler ZK a number of line wires have been illustrated. By way of these lines, and with a frequency which differs from line to line, the time pulse generator ZTG emits time clock pulses which serve to form charge metering pulses in a metering pulse generator and transmit these charge metering pulses from the metering pulse generator. This has already been described in detail in the aforementioned German Pat. No. 2,218,129. Furthermore, it is already known to determine the frequency of the charge metering pules produced for a trunk telephone connection, not only on the basis of the distance, but also in dependence upon the time of day and calendar dates, e.g. specific days of the week, general holidays and the like. Whereas, during normal working days, all day long the various charge zones are assigned higher charge metering pulse frequencies staggered in accordance with distance, and in fact the zones relating to the furthest distances are assigned in the higher charge metering pulse frequencies, in contrast during the evening lower charge metering pulse frequencies are provided, again staggered in terms of distance; at night, on Sundays and on general holidays again charge metering pulse frequencies apply which are even lower than those which apply during the evening and which are likewise staggered in terms of distance.

In accordance with the invention, it is now provided that on the reception of a special code number which is dialed, in addition to the local code number and subscriber number, and which, in particular, precedes the latter in association with the establishment of a trunk telephone connection, a common control device stores a renunciation characteristic for this trunk telephone connection. This special code number will be assumed to be a code number which is not used as a local code number, e.g. a code number which begins with the digit zero. This special code number can be dialed by a calling subscriber and, in fact, following the traffic distinguishing digit zero, and prior to the local code number. Having dialed this special code number, the calling subscriber dials the local code number and the subscriber number. If this special code number is received during the course of the establishment of a connection in the relevant register R2, the register stores a renunciation characteristic corresponding to the special code number in respect of the trunk telephone connection being established. This can take place, for example, in the storage unit z1 which is assigned either temporarily or semi-permanently to the metering pulse generator in question, e.g. Z1, within the register R2. By dialing this special code number the calling subscriber expresses the fact that he is dispensing with the general reduction in charge tariff provided in accordance with the time of day and/or calendar dates.

The register R2 carries out the connection establishment in the known, already described manner. During the course of hunting operations in order to select a free connection line from a group of connection lines, e.g. V1, V2 etc., for each of a plurality of simultaneously established trunk telephone connections, the register R2 which operates as common control device gives preference to those trunk telephone connections in respect of which a renunciation characteristic is stored, and, in fact, with priority over these trunk telephone connections in respect of which no renunciation characteristic is stored. Therefore, if the register R2 is involved simultaneously in the establishment of a plurality of connections, it gives precedence to establishing those connections in respect of which a renunciation characteristic is stored. If a free connection line is to be selected from one and the same group for each of the connections to be established, precedence is given to those connections which are being established in respect of which a renunciation characteristic is stored. If a larger number of registers is provided and one register operates simultaneously for one single connection establishment at any one time, those registers which have stored a renunciation characteristic have priority in the use of the central converter U in comparison to those registers which have not stored a renunciation characteristic. If the connection establishment is carried out with the aid of a central control unit, which receives the dialed information arriving from the various subscribers from all the dialing reception devices, in the handling of the various connection establishments it gives preference to those connections in respect of which a renunciation characteristic has been stored in response to the arrival of a special code number. The procedure for connection establishment providing priority for those trunk telephone connections in respect of which a renunciation characteristic has been stored in comparison to those trunk telephone connections in respect of which no renunciation characteristic has been stored, may be carried out in a number of possible ways, of which only a few examples are to be described here, the total conceivable number of which cannot be described, however. This priority treatment is of particular significance in the event that the various trunk telephone connections being established must be established via lines belonging to one and the same connection line group. In this case the priority relates to the selection of free lines from the connection line group in question.

The aforementioned priority handling only comes into force when the reduction in the charge metering pulse frequencies which is provided for various range zones and which is dependent upon the time of day and/or the calendar date is operative. If, during the course of establishing a connection the register R2 receives the zero characteristic corresponding to the dialed local code number, from the central converter U, via a path r2 it sets up the zone coupler ZK in accordance with this zone characteristic and in accordance with the address of the relevant metering pulse generator. This metering pulse generator is supplied with the charge metering pulse train which corresponds to the zone characteristic in question. Therefore, the line which leads from the zone coupler ZK to the relevant metering pulse generator, e.g. Z1, is connected to that output of the time pulse generator ZTG which emits charge metering pulses at the charge metering pulse frequency required in accordance with the zone characteristic.

It has already been described that, in dependence upon the storage of the renunciation characteristic on the basis of the reception of the special code number prior to the local code number in respect of a connection which is being established, this connection is given priority over other connections in respect of which no renunciation characteristic has been stored, in that the register R2 which carries out the connection establishment and which operates simultaneously for a plurality of connections being established, firstly establishes those connections in respect of which the renunciation characteristic is stored. During hunting operations for the selection of a free connection line from one and the same group of connection lines for each of a plurality of simultaneously established telephone connections, the register R2 which operates as common control device selects a free connection line from the group of connection lines in question for those telephone connections in respect of which a renunciation characteristic is stored, but only with priority over those trunk telephone connections in respect of which no renunciation characteristics has been stored when the reduction in the charge metering pulse frequencies provided for the various range zones which is dependent upon the time of day and/or the calendar date is in operation; otherwise, the register R2 carries out the hunting operations required for the various trunk telephone connections with equal priority. The criterion which is emitted by a clock (not shown) and which brings about the reduction in the charge metering pulse frequencies thus operates together with the renunciation characteristic stored for a connection which is being established in terms of preferred connection establishment. Therefore, this preferred connection establishment takes place only when both the renunciation characteristic for a connection which is being established and also the criterion which results in the reduction in the charge metering pulse frequencies are contained in the register R2. If the connection is carried out not with a register but with a partially central control unit or a central control unit, the switching process in accordance with the invention take place accordingly. The explained preferred connection establishment can also be manifest in such manner that when a plurality of registers are provided which can use the central converter via an automatically blocking checking multiple, a register which serves to carry out preferred connection establishment is given priority use of the converter U in comparison to the other registers. Use of a central converter by a plurality of registers with differing stages of urgency is described, for example, in the German Pat. No. 2,046,960.

There will now follow an explanation of how, following the establishment of a telephone connection in respect of which a renunciation characteristic is stored, the common control device deactivates a criterion which results in the reduction of the frequency of the charge metering pulses, for this trunk telephone connection. For each of the given range zones the central metering pulse generator ZTG continuously supplies pulses each having a pulse frequency which corresponds to the range zone in question. On its upper side (in the drawing) the central metering pulse generator ZTG is provided with as many outputs as range zones are provided. As shown in the drawing, each output of the central metering pulse generator ZTG is connected to a make-and-break contact having a central rest position. Thus this contact has two operating positions which are referenced zg1 and zg2. In operating position zg1 the relevant output of the central metering pulse generator is connected to ground potential, but when the contact zg occupies operating position zg2 it is connected to a negative potential. The contact zg is switched into each of its two operating positions in pulse-controlled fashion. It assumes operating position zg1 at a frequency which corresponds to the unreduced charge metering pulse frequency of the relevant charge zone. On the other hand, it assumes operating position zg2 with a frequency which corresponds to the charge metering pulse frequency which is reduced for the relevant charge zone in accordance with the time of day and calendar dates. If pulses of these two different pulse frequencies are to coincide, one of the two pulses in question is somewhat delayed so that the two pulses are emitted consecutively. The pulses which belong to these two pulse sequences differ in polarity, as can be seen from the drawing. The pulses which correspond to the unreduced metering pulse frequency are ground pulses. On the other hand, the pulses which correspond to the reduced metering pulse frequency are pulses formed with negative potential.

As already explained, by way of the zone coupler, ZK a metering pulse pulse generator via which a connection has been established is connected to that output of the central metering pulse generator ZTG which corresponds to the charge zone in question. Pulses of two different polarities now arrive via the current path in question in a metering pulse generator across which a connection has been switched through, and here the pulses of each of the two polarites on the one hand correspond to the established charge zone but, on the other hand, correspond either to the unreduced metering pulse frequency or to the reduced metering pulse frequency. With the aid of the relay Z the pulses of one of the two pulse trains are recorded in the metering pulse generator Z1. The pulse train from which the pulses are recorded with the aid of the relay Z will depend upon the position of the contact e of the relay E. If the relay E occupies its rest position, the central spring of the transfer contact e is connected to the rectifier G2. In this case the relay Z receives the pulses with the unreduced metering pulse frequency. If the relay E is actuated and its contact e is brought into the operating position, the current path is closed via the rectifier G1. Under these circumstances the relay Z receives the pulses which are emitted from the central metering pulses generator ZTG with the reduced metering pulses frequency. Therefore, the relay E can be used to provide that as regards a metering pulse generator Z1 either the pulses with the reduced frequency or the pulses with the unreduced frequency are recorded by means of the relay Z. The manner in which these pulses are used to transmit charge metering pulses to the charge meter of the calling subscriber is described in the aforementioned German Pat. No. 2,218,129.

As already stated, following the establishment of a trunk telephone connection in respect of which a renunciation characteristic is stored, the register R2 deactuates a criterion, which results in the reduction of the frequency of the charge metering pulses, in respect of this trunk telephone connection. This is carried out with the aid of the relay E in the metering pulse generator Z1. If the contact e occupies the illustrated rest position, as described the relay Z receives pulses with the unreduced frequency. If the frequencies of the charge metering pulses which apply to the various charge zones hae been reduced in dependence upon the time of day and/or the calendar date, on the occasion of each connection establishment the relay E is actuated into the metering pulse generator. As a result the relay Z receives the pulses with the reduced pulse frequency from the central metering pulse generator ZTG. This criterion (connection of the relay E) is deactivated in the controlling register R2, e.g. is suppressed, when, during the establishment of the trunk telephone connection in question, a renunciation characteristic has been stored for this connection. On the basis of this renunciation characteristic, the reduction in the charge metering pulse frequency for the trunk telephone connection is suppressed.

The foregoing description has explained the mode of operation in accordance with the invention of a trunk telephone exchange (illustrated in the drawing below the dash-dotted line). Several groups of connection lines lead away from this trunk telephone exchange. However, the invention can also be used equally well in local exchanges. In these local exchanges just one single group of connection lines can be provided consisting of the lines L1 and L2 via which outgoing trunk telephone connections are established from the local exchange (in the drawing illustrated above the dash-dotted line). The local exchange can also receive the special code number for a trunk telephone connection which is to be established, which can be analyzed for the storage of the renuciation characteristic for this particular connection. Here, again, the renunciation characteristic can be used for a preferred connection establishment in the described manner.

The possibility also exists that during connection establishment in the trunk telephone exchange, in the event that a renunciation characteristic is stored for a trunk telephone connection which is being established, and in the event that lines are engaged following a hunting operation which comprises a group of trunk telephone lines, the register R2, which carries out the connection establishment, can repeat this hunting process. This repetition can occur just once or several times and with arbitrary frequency. Therefore, this represents the repetition of a connection establishment wherein the repeated attempts at connection establishment merely lead to lines being engaged, and a last attempt at connection establishment successfully concludes the desired connection establishment. The relevant details are described in the German Pat. No. 1,249,357.

Finally, reference will also be made to another possible development of the invention in which it is provided that in the event that the criterion which results in a reduction in the frequency of the charge metering pulses in respect of a telephone connection is deactivated, the common control device transmits an audible signal which indicates this fact to the calling subscriber, or else a corresponding message to this subscriber. This audible signal, or corresponding message, can be emitted via the metering pulse generator across which a trunk telephone connection has been established, directly following the arrival of the answer characteristic and before the final switch through of the connection to the calling subscriber. This can be effected with the aid of the relay E.

Although I have described my invention by reference to preferred embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a circuit arrangement for telecommunications exchanges in which trunk connections are established with the aid of a common control device via free connection lines which are combined in groups in response to a calling subscriber dialing a local code number and a subscriber number of a called subscriber, and in which charge metering pulses are produced by charge metering equipment for the calling subscriber in reponse to answer by the called subscriber and at a frequency which is reduced in accordance with criteria including distance, time of day and calendar date, the improvement comprising:

first means responsive to a special, subscriber-dialed, code number preceeding the subscriber number to store a renunciation character; second means for selecting a free connection line from a group of connection lines which are simultaneously to be connected and responsive to stored renunciation characters to select free connection lines on a priority basis for those calling subscribers dialing a special code number only when charge metering reduction is in effect and to otherwise select lines on an equal priority basis; and third means responsive to a renunciation character and upon trunk line selection and completion of trunk line connection to provide a charge reduction signal to the charge metering equipment.

2. The improvement of claim 1, and further comprising: fourth means operating to cause said second means to perform a predetermined number of hunting cycles for trunk line selection in response to a renunciation character and all trunk lines searched being busy.

3. The improvement of claim 1, and further comprising: fifth means responsive to a loss of the charge reduction signal to transmit information signals to the calling subscriber.

* * * * *